G. T. ROYER.
COOP.
APPLICATION FILED JAN. 20, 1916.
1,209,622.
Patented Dec. 19, 1916.
2 SHEETS—SHEET 1.
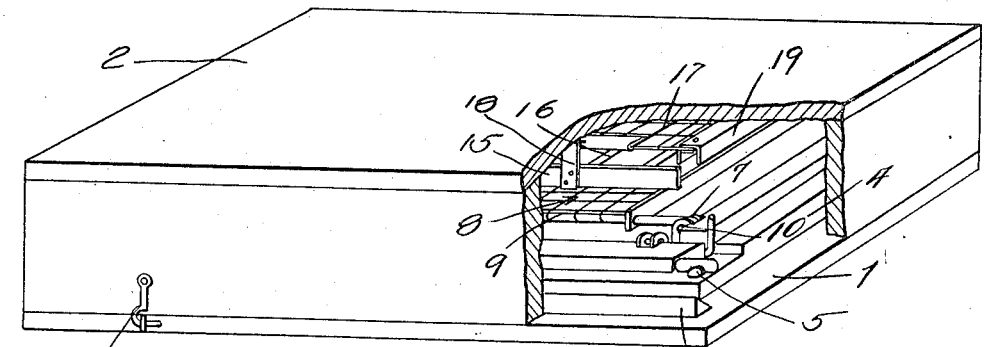
FIG. 1.
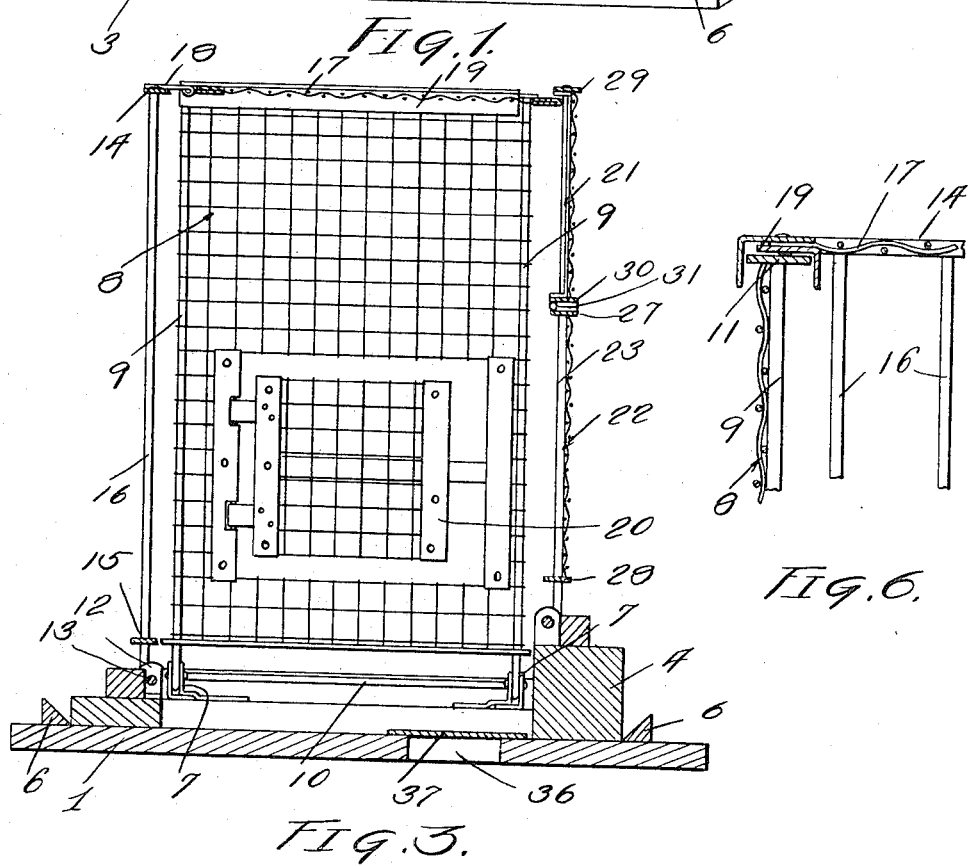
FIG. 3.
FIG. 6.
Witnesses
Inventor
G. T. Royer
By
Attorney

G. T. ROYER.
COOP.
APPLICATION FILED JAN. 20, 1916.

1,209,622.

Patented Dec. 19, 1916.
2 SHEETS—SHEET 2.

Inventor
G. T. Royer

UNITED STATES PATENT OFFICE.

GEORGE T. ROYER, OF GARFIELD, UTAH, ASSIGNOR OF ONE-SIXTH TO THEO. PETERSON, OF GARFIELD, UTAH.

COOP.

1,209,622.  Specification of Letters Patent.  Patented Dec. 19, 1916.

Application filed January 20, 1916. Serial No. 73,202.

*To all whom it may concern:*

Be it known that I, GEORGE T. ROYER, a citizen of the United States, residing at Garfield, in the county of Salt Lake, State of Utah, have invented certain new and useful Improvements in Coops; and I do hereby declare the following to be a full, clear, and exact description of the invention, such as will enable others skilled in the art to which it appertains to make and use the same.

This invention relates to a coop.

An object of the invention resides in a provision of a coop which is of such construction that it will be convenient to use at exhibitions or shows.

A further object of the invention resides in so constructing the device that the parts thereof may be readily folded and placed in a suitable box or receptacle.

A further object of the invention resides in so constructing the device that the bottom of the coop will form the cover for the receptacle.

With these and other objects in view, such as will appear as my description progresses, my invention comprises the combination and arrangement of parts as set forth in and falling within the scope of the appended claims.

In the drawings: Figure 1 is a perspective view showing the complete device with a portion of the receptacle broken away to disclose the coop within; Fig. 2 is a perspective view of the coop, the receptacle being removed; Fig. 3 is a vertical sectional view taken transversely of the coop; Fig. 4 is a detail sectional view showing the locking member; Fig. 5 is an end elevation showing the parts started to their folded positions, and Fig. 6 is a detail sectional view on line 6—6 of Fig. 2.

Referring to the drawing by reference characters wherein like parts are indicated by like characters throughout the several views: I have illustrated a form of my device which consists of a base 1, which base acts as a cover for the receptacle 2 and is locked upon the receptacle by suitable latches 3. A frame 4 is secured to the base 1 by means of thumb screws 5 which pass through the frame and into threaded apertures in the base. This frame is located between a pair of inclined guides 6 which facilitate the placing of the frame upon the base and position the receptacle on the cover. Ears 7 are mounted on the end bars of the frame. End pieces 8 which are made of suitable wire mesh are mounted between these ears, eyes being formed on the lower ends of the side bars 9 of the end pieces, which eyes are disposed between the ears 7. Rods 10 pass through these eyes and through openings in the ears and are removable therefrom so that when desired the end pieces may be entirely removed from the frame 4. The side bars 9 of these end pieces are joined together at their upper ends by flat bars 11. The front of the coop is hinged between ears 12 on the front bar of the frame 4, a removable rod 13 passing through the ears and through eyes on the lower ends of the side bars of the front. This front piece referred to includes upper and lower horizontal bars 14 and 15 and vertically extending rods 16. A cover 17 which is formed of wire mesh is hinged at 18 to the upper horizontal bar 14 and this cover is provided with channel pieces 19 on its ends which are adapted to receive the upper bars 11 of the end pieces when the parts are in their operative positions. One of the end pieces is provided with a suitable door 20. The back piece of the coop includes a pair of sections 21 and 22. The section 22 includes side bars 23 which are provided with eyes 24 on their lower ends, which eyes are located between ears 25 on the frame 4 and are pivotally mounted on a removable rod 26. This section 22 further includes upper and lower horizontal bars 27 and 28. The section 21 is similar in formation to the section 22, including upper and lower horizontal bars 29 and 30 and is hinged to the upper bar 27 of the section 22 by suitable hinges 31. The bars 29 and 30 of the section 21 and the bar 27 of the section 22 are provided with alined apertures 32. Rods 33 are slidably mounted in the section 21 and are adapted to extend through said apertures so as to secure the section 21 rigidly with the section 22 and prevent the movement of the former section upon its hinges. In order that this back of the coop may be secured to the cover, I have provided the rods 33 with arms 34 which are provided with hooks on their ends. These arms are adapted to swing above the cover and the hooks to engage in the wire mesh thereof.

It will thus be seen that when the device is in its assembled position the channel members on the cover will engage the upper bars 11 of the end pieces and will maintain the latter in their proper position. Furthermore when the rods 33 extend through the alined apertures 32 the sections of the back will be held rigidly together and when the hooks on the ends of the arms 34 engage the wire mesh of the cover the back will be secured in place.

The base of the device is provided with an opening 36 which is covered by a removable cover 37, the latter being slidable between the base and the frame 4.

Referring to Fig. 5 of the drawing it will be noted that when it is desired to fold the device the end pieces are first folded upon the base and within the frame 4. The sections of the back are then folded upon one another, this being permitted because of the fact that the rods 33 are movable. The back thus folded is then folded upon the end pieces. The cover is then folded upon the front piece and the rod on which this front piece is pivotally mounted is removed so that the front piece may be laid upon the back piece. When the parts are thus folded they may be placed in the receptacle 2 at which time the base 1 will form a cover for the receptacle.

When it is desired to clean the device the entire frame 4 may be removed from the base but should it be desired to clean the device when it is in use the sliding cover 37 may be withdrawn and the refuse pushed through the opening 36 in the base 1.

From the foregoing description it will be seen that I have provided a very simple coop which is collapsible and which will occupy a very small space when collapsed. Furthermore I have so constructed the device that the base of the coop forms a cover for a receptacle in which the device is adapted to be placed when it is folded.

While I have illustrated and described a particular embodiment of my invention, it has merely been for the sake of convenience and I do not wish to be limited to that particular embodiment as it is obvious that numerous changes may be made in the details of construction without departing from the spirit of the invention or exceeding the scope of the appended claims.

What I claim is:—

1. In a coop, the combination with a base, of a frame detachably mounted thereon, folding sides, ends and top mounted on the frame, a receptacle of which said base forms the cover, and guide strips secured to the base to position the frame thereon and to position the receptacle on the cover.

2. In a coop, the combination with a base, of a frame detachably mounted thereon, end pieces hinged to the frame, a back piece hinged to the frame, a front piece hinged to the frame and a cover hinged to the front piece, the said cover having channel members thereon for the reception of the upper ends of the end pieces, the back piece being formed in two sections hinged together and rods for securing the said sections in rigid relation and simultaneously attaching the back piece to the cover.

In testimony whereof, I affix my signature, in the presence of two witnesses.

GEORGE T. ROYER.

Witnesses:
CHAS. H. LINCK,
GILBERT PALMER.

Copies of this patent may be obtained for five cents each, by addressing the "Commissioner of Patents, Washington, D. C."